United States Patent Office 3,444,126
Patented May 13, 1969

3,444,126
MONOVINYLIDENE AROMATIC HYDROCARBON-UNSATURATED NITRILE COPOLYMERS STABILIZED WITH HYDROCARBONS
Henry K. Chi, Longmeadow, Mass., assignor to Monsanto Company, St. Louis, Mo., a corporation of Delaware
No Drawing. Filed May 22, 1967, Ser. No. 640,353
Int. Cl. C08f 45/58
U.S. Cl. 260—45.7      5 Claims

ABSTRACT OF THE DISCLOSURE

There is disclosed novel stabilized interpolymers of an unsaturated nitrile monomer and a monovinylidene aromatic hydrocarbon wherein the preformed interpolymer is intimately admixed with from about 0.05 to 3.0 percent, based upon the weight of the preformed interpolymer, of a stabilizer selected from the class consisting of terpinolene, dipentene, p-mentha-1,5-diene, p-cymene, 1,3-cyclooctadiene, octene, alpha-methylstyrene dimer, and mixtures thereof. The monovinylidene aromatic hydrocarbon constitutes at least 50 percent by weight of the interpolymer and the unsaturated nitrile monomer constitutes at least 1.0 percent by weight of the interpolymer and is selected from the group consisting of acrylonitrile, methylacrylonitrile, ethacrylonitrile, propacrylonitrile, butacrylonitrile and mixtures thereof.

BACKGROUND OF THE INVENTION

Interpolymers of unsaturated nitrile monomer and a monovinylene aromatic hydrocarbon have attained a significant degree of commercial importance in the form of copolymers with each other, interpolymers with other monomers and graft copolymers upon rubbery substrates. The tendency of such interpolymers toward discoloration caused by exposure to elevated temperatures and/or aging has presented some drawbacks to more widespread usage, particularly since such polymers are generally thermoformed under elevated temperatures in processing steps subsequent to polymerization and recovery of the interpolymer. Many additives have been incorporated into polymeric compositions of this type in efforts to avoid undesirable coloration caused by heat and aging, but they have not proven wholly satisfactory in achieving their objective. Certain of the additives provide only a relatively low level of color stability or provide satisfactory stability only for a relatively short period of time. In many instances, the additives are expensive or introduce undesirable characteristics into the polymeric composition, such as coloration of their own, haze, reduced light stability or a reduction of the mechanical properties of the product.

Accordingly, it is an object of this invention to provide color-stabilized polymeric compositions containing an interpolymer of at least 1.0 percent by weight of an unsaturated nitrile monomer and at least 50.0 percent by weight of a monovinylidene aromatic hydrocarbon.

It is also an object to provide such polymeric compositions which exhibit not only reduced tendency toward coloration but also have good mechanical properties and freedom from haze.

Another object is to provide such compositions utilizing novel stabilizers which are relatively inexpensive, highly effective and readily admixed with the interpolymer.

It is a further object to provide a facile and econmical method for providing such stabilized compositions.

SUMMARY OF THE INVENTION

It has now been found that the foregoing and related objects and advantages can be readily attained in a stabilized composition which comprises a preformed interpolymer containing at least 1.0 percent by weight of an unsaturated nitrile monomer interpolymerized with at least 50.0 percent by weight of a monovinylidene aromatic hydrocarbon monomer, the interpolymer being intimately admixed with from about 0.05 to 3.0 percent by weight thereof of a stabilizer selected from the class consisting of terpinolene, dipentene, p-mentha-1,5-diene, p-cymene, 1,3-cyclooctadiene, octene, alpha-methylstyrene dimer and mixtures thereof.

Other optional components may be included in the compositions such as plasticizers, lubricants, fillers, colorants and other stabilizers and antioxidants which are compatible therewith. For example, polyblends containing rubbers will desirably include an antioxidant for the rubber such as the hindered phenols (e.g., di-tert-butyl-p-cresol).

The preformed interpolymer

The interpolymers which are stabilized with the herein-described stabilizers contain at least about 1.0 percent by weight of an unsaturated nitrile monomer selected from the group consisting of acrylonitrile, methacrylonitrile, ethacrylonitrile, propacrylonitrile, butacrylonitrile and mixtures of such unsaturated nirtile monomers. Preferably, the interpolymers contain about 10 to 50 percent of unsaturated nitrile, and most desirably 20 to 35 percent by weight thereof. In addition to the unsaturated nitrile, the interpolymers contain at least 50 percent and up to about 99 percent, and preferably about 65 to 80 percent, by weight of a monovinylidene aromatic hydrocarbon monomer copolymerized therewith. Exemplary of the monovinylidene aromatic hydrocarbons are styrene; ar-alkyl styrenes, such as the o-, m- and p-methylstyrenes, 2,4-dimethylstyrene, ar-ethyl styrenes, p-tert-butyl styrene, etc.; alpha-alkylstyrenes such as alpha-methylstyrene, alpha-ethylstyrene, alpha-methyl-p-methylstyrene, etc.; vinyl naphthalene; and mixtures thereof.

In addition to the unsaturated nitrile and monovinylidene aromatic hydrocarbon components, the present interpolymers may contain monomers copolymerizable with the nitrile and monovinylidene aromatic hydrocarbon. Such additional monomers include the conjugated 1,3-dienes (e.g. butadiene, isoprene, etc.); acrylic acid, methacrylic acid, the alkyl (alk) acrylates (e.g., methyl acrylate, ethyl acrylate, propyl acrylate, butyl acrylate, 2-ethyl hexyl acrylate, the corresponding alkyl methacrylates, etc., and mixtures thereof), the acrylamides (e.g., acrylamide, methylacrylamide, N-methyl acrylamide, etc., and mixtures thereof), vinyl halides (e.g. vinyl chloride, vinyl bromide, etc.); vinylidene halides (e.g. vinylidene chloride, vinylidene bromide, etc.); vinyl esters (e.g. vinyl acetate, vinyl propionate, etc.); the dialkyl maleates and fumarates (e.g., diethyl maleate, dibutyl fumarate, etc., and mixtures thereof). The amount of the additional monomer may range from 0 to 40 percent by weight of the interpolymer and preferably is less than 30 percent.

The preformed interpolymer of the present invention can be a graft blend prepared by polymerizing the monomers of the interpolymer in the presence of a preformed polymeric rubbery substrate. The product consists of a graft copolymer wherein a superstrate of the interpolymer is grafted upon a substrate of the preformed rubbery polymer and a matrix of polymerized monomer. Depending upon the rubbery substrate and the nature of the polymerization reaction, there may also be a small proportion of ungrafted preformed polymer.

Exemplary rubbery substrates are diene rubbers, natural rubbers, ethylene-propylene terpolymer rubbers, ethylene-propylene copolymer rubbers, acrylate rubbers, polyisoprene rubbers, as well as interpolymers thereof with each other or with copolymerizable monomers. The preferred rubbers are diene rubbers, including conjugated 1,3-dienes, interpolymers of conjugated 1,3-dienes with one another and interpolymers of one or more conjugated 1,3-dienes with up to an equal amount by weight of one or more copolymerizable monoethylenically unsaturated monomers such as monovinylidene aromatic hydrocarbons such as styrene, unsaturated nitriles such as acrylonitrile, alkyl acrylates and methacrylates such as ethyl acrylate and methyl methacrylate. The rubber will comprise less than 40.0 percent by weight of the blend including both the graft superstrate and matrix of the interpolymer and preferably less than 30.0 percent thereof. The rubber content of the final composition may vary within the range of about 5.0 to 25.0 percent by weight for beneficial impact resistance where such is desired.

The present invention also contemplates physical blends wherein a quantity of a rubber component and/or of a resin is physically blended with the previously described preformed interpolymers, including graft copolymers. The resin employed may be any which is compatible with the preformed interpolymer, such as those which are formed from the monomers indicated above and monomers related thereto. Similarly, the rubber employed may be those exemplified above. The blend will, of course, contain the various components in proportions in which they are mutually compatible and will consist at least predominantly of the interpolymers of unsaturated nitriles and monovinylidene aromatic hydrocarbons.

The interpolymers employed can be prepared in any conventional polymerization process including mass, suspension, solution and emulsion techniques and by combinations of such techniques. The process employed may either be batch or continuous.

The stabilizer

The compounds which function as stabilizers in accordance with this invention are terpinolene, dipentene, alpha-methylstyrene dimer, p-mentha-1,5-diene, p-cymene, 1,3-cyclooctadiene and octene.

As used herein, the terms "terpinolene, dipentene, p-mentha-1,5-diene, p-cymene, 1,3-cyclooctadiene and octene" include the respective structural and optical isomers thereof. It will be appreciated that in many instances the compounds designated will be most readily available in impure forms, commercial products often containing mixtures of the foregoing and related compounds, and isomers thereof.

The stabilizer will be utilized in an amount ranging between 0.05 and 3.0 percent based upon the weight of the preformed interpolymer with which it is intimately admixed. Preferably, the stabilizing additive will be employed in an amount between 0.1 to 1.0 percent, and most desirably between 0.2 and 0.5 percent. It has been found that utilization of quantities of stabilizer greater than 3.0 is generally without additional benefit to stability. Conversely, use of an amount of stabilizer less than 0.05 percent has been found to give insufficient protection to be of value as a practical matter. Mixtures of two or more of the foregoing stabilizers may be employed, and mixtures thereof with other stabilizing additives may also be found to be beneficial.

The incorporation procedure

The stabilizing additives of the present invention are effective to significantly reduce the development of color in unsaturated nitrile/monovinylidene aromatic hydrocarbon interpolymers when added to the interpolymer after it has been formed, i.e., after the interpolymerization reaction between the interpolymerizable monomers has been completed. The type of stabilizers disclosed herein are readily oxidized and, in the oxidized state, promote rather than deter the development of undesirable coloration. Therefore, adding the stabilizing additives to the monomers during polymerization is undesirable because they may enter into the polymer chain so as to preclude their being present in free form in the final composition.

The form of the polymer to which the stabilizer is added is relatively unimportant. Preferably, the stabilizer is added to the dry beads, dried crumb or extruded pellets. When the interpolymer is produced by an aqueous technique such as an emulsion or suspension process, the stabilizing additive may be added directly to the aqueous dispersion of the suspended or emulsified polymer. In considering such an alternative, however, it should be borne in mind that such aqueous environments tend to promote oxidation and an inert non-oxidizing atmosphere should, therefore, be provided over the dispersion and the recovered polymer during drying.

In its preferred embodiments, the present process is carried out by adding the stabilizers to the polymers at as low a processing temperature as is feasible, and by admixing the additive as quickly as possible after addition to the polymer. Both of these precautions minimize the opportunity for oxidation of the stabilizer and, therefore, produce superior products. It has been found that a dwell time prior to extrusion of as little as three hours at as low a temperature as 35° centigrade results in a product which is inferior.

If the dwell time involved is very short, the temperature of the polymer can be relatively high. For example, when the stabilizer is added directly to the extruder, the temperature of the polymer can be that at which the dried beads are discharged from the drier (i.e., about 50–60° centigrade) without fear of a significant level of oxidation. If, on the other hand, the temperature of the polymer is maintained at a very low level, the dwell time of the stabilizer on the polymer can be quite long. The skilled practitioner will readily determine the optimum balance of dwell time and temperature to achieve the most desirable products.

Since the stabilizers of the present invention are highly beneficial to retard the development of undesirable coloration in the preformed interpolymers, the stabilized compositions may be extruded, molded, or otherwise subjected to elevated temperatures, exemplary of which are the common extrusion temperatures ranging between 380 and 520° Fahrenheit. As compared to unstabilized polymers of the same composition, the stabilized polymers will exhibit no increase in coloration or, at most, a much diminished level thereof. The design of the apparatus employed for subsequent treatment is relatively unimportant; however, to diminish adverse results due to oxidation, the most desirable equipment will be that in which there is a minimum of hang-up and residue on the walls and other surfaces. It is apparent that stabilizer which remains in the apparatus will have an increased tendency to oxidize and thereby contaminate or diminish the desirability of subsequent charges of polymer. From this standpoint, the most preferred equipment is of the continuous in-line type.

Description of the preferred embodiments

Illustrative of the efficacy of the present invention are the following specific examples wherein all parts and percentages are by weight unless otherwise indicated.

Example 1.—The interpolymer employed is a styrene/acrylonitrile copolymer (SAN) prepared by copolymerizing a monomer mixture containing about 26.5 percent of acrylonitrile and, correspondingly, about 73.5 percent of styrene.

Three control samples are prepared by extruding pellets of the SAN copolymer at 40° Fahrenheit stock temperature. A first control specimen (A) is prepared by extruding a quantity of the SAN polymer and then molding the extruded sample to form a chip. A second control specimen (B) is prepared by subjecting the SAN pellets to two passes through the extruder, after which the polymer is molded into a chip. A third specimen (C) is similarly prepared, but is subjected to three passes through the extruder prior to formation of the chip.

A second series of three test specimens corresponding to the control specimens is prepared, one of which is extruded once (D), another of which is extruded twice (E), and the third of which is subjected to three passages (F). In these test specimens, however, 0.5 percent by weight, based upon the weight of SAN copolymer, of a commercial grade of terpinolene is admixed with the polymer no more than three hours prior to the first extrusion. The terpinolene and polymer are initially blended by adding the terpinolene into dried SAN beads and blending the mixture at room temperature (about 25° centigrade) for about one-half hour. Chips are molded from the test samples in the same manner as employed to produce chips from the control samples.

As an indication of the color stability of the SAN polymers, the three point yellowness values (3PY) of the various chips produced are determined. Three point yellowness values, which are commonly used as a measure of the coloration of a plastic specimen, are determined in the following manner:

On a G. E. Recording Spectrophotometer, light a three different frequencies (i.e., 700, 500 and 420 m$\mu$) is directed at the sample to be evaluated. After passing through the specimen initially, the light is reflected back by a white porcelain surface positioned behind the specimen. After passing back through the specimen, the percentage of the light transmitted at each frequency is measured. This measured value is then employed in the formula which follows to determine the three point yellowness of the sample:

$$3PY = 2A - (B+C)$$

wherein A is the percentage of light transimted at 700 mu; B is the percentage of light transmitted at 500 mu; and C is the percentage of light transmited at 420 mu.

The data in Table 1 below show that in each instance the polymer containing the terpinolene has a significantly lower three point yellowness value and hence a higher level of stability to heat, than the corresponding unstabilized sample. The stabilized samples exhibit three point yellowness value reductions over the unstabilized polymers ranging between about 10 and 24 percent.

TABLE 1

| Number of extrusion passes | Control specimens | | Test specimens | |
|---|---|---|---|---|
| | Designation | 3PY | Designation | 3PY |
| 1 | A | 24.1 | D | 19.6 |
| 2 | B | 31.5 | E | 24.0 |
| 3 | C | 37.5 | F | 29.8 |

Example 2.—When an unsaturated nitrile/monovinylidene aromaitc hydrocarbon interpolymer is to be subjetced to successive elevated temperature treatments, incorporation of quantities of the stabilizers of the present invention prior to each successive treatment is beneficial. This is demonstrated by the present example wherein an SAN copolymer having the same composition as that used in Example 1 is employed. In this example, a first sample containing 0.5 percent of commercial terpinolene is subjected to a single pass through an extruder and then molded into chips (Specimen G). To produce a second Specimen (H), a portion of the first sample, already extruded, is reextruded prior to formation into chips. To demonstrate the desirability of incorporating stabilizer prior to each elevated temperature treatment, a sample of the SAN copolymer containing 0.5 percent of terpinolene is extruded; after cooling this sample, an additional 0.5 percent of terpinolene is added, after which the blend is reextruded. Molded chips are then formed (Specimen I), and the three point yellowness value of the chips are determined. The data in Table 2 below indicate the desirability of multiple additions of the stabilizer.

TABLE 2

| Specimen | Description | 3PY |
|---|---|---|
| G | Single extrusion, one charge of stabilizer | 22.6 |
| H | Double extrusion, one charge of stabilizer | 29.3 |
| I | Double extrusion, charge of stabilizer prior to each extrusion pass | 25.5 |

Example 3.—Utilization of the instant stabilizers serves not only to protect the subject interpolymers from deterioration at elevated temperatures, but also provides protection for the polymers against the development of undesirable coloration due to aging. Samples of the SAN copolymer composition of Example 1 are prepared and allowed to age under ambient conditions for extended periods of time, after which the three point yellowness values thereof are determined. Data are presented in Table 3 below for two levels of incorporation of commercial terpinolene in comparison with a sample containing no stabilizer. Measurements are made initially, after nine days, after twenty-two days, and after forty-two days. These data clearly show the resistance to age yellowing which is provided to the SAN copolymers by the incorporation of terpinolene stabilizer.

TABLE 3

| Percent terpinolene | 3PY | | | |
|---|---|---|---|---|
| | 0 days | 9 days | 22 days | 42 days |
| 0 | 27.2 | 30.1 | 30.8 | 28.3 |
| 0.20 | 19.7 | 21.6 | 22.8 | 21.5 |
| 0.50 | 19.5 | 20.7 | 20.4 | 19.4 |

Example 4.—A control sample of the same SAN copolymer composition as that employed in the foregoing examples is extruded, formed into chips and evaluated for three point yellowness. Similar samples are prepared but with the incorporation of 0.5 percent by weight, based upon the weight of the copolymer, of commercial grades of each of the stabilizing additives of the present invention. The data in Table 4 which follows indicate the effectiveness of the various stabilizing additives as compared to the control sample, as indicated by the respective three point yellowness values thereof.

TABLE 4

| Stabilizer: | 3PY |
|---|---|
| Terpinolene | 19.1 |
| Dipentene | 19.7 |
| p-Mentha-1,5-diene | 19.7 |
| p-Cymene | 19.8 |
| Alpha-methylstyrene dimer | 19.8 |
| 1,3-cyclooctadiene | 19.9 |
| Octene | 20.0 |
| Control | 25.3 |

Example 5.—Specimens of the 73.5/26.5 SAN copolymer with and without 0.5 percent of commercial terpinolene stabilizer are prepared and compared to determine the effect of the stabilizer upon the haze, mechanical properties and stability of the products against ultraviolet and fluorescent light. There is found to be either no effect or an improvement in the haze value due to the inclusion of the sabilizer. The stability of the polymer to both ultraviolet and fluorescent light is not adversely affected; and, as regards tensile, flexural and impact properties, the stabilized samples are essentially the same as the controls.

Example 6.—Benefits similar to those obtained in the preceding examples are obtained when:

(A) The composition is a graft blend containing a graft copolymer of styrene/acrylonitrile copolymer on a butadiene substrate with a matrix of the styrene/acrylonitrile copolymer, the styrene to acrylonitrile ratio varying from 80:20 to 65:35 and the superstrate to substrate ratio varying from 1.3:1 to 0.4:1.

(B) The interpolymer includes as another monomer methyl methacrylate, butadiene, acrylamide, acrylic acid in amounts of 5 to 30 percent by weight of the interpolymer.

(C) The composition is a mechanical blend of the interpolymers hereof with preformed polymers of styrene, methyl methacrylate, vinyl chloride, butadiene, styrene and methyl methacrylate, with the interpolymers hereof constituting 65 to 90 percent by weight of the composition.

Thus, it can be seen that the present invention provides novel stabilized polymeric compositions containing interpolymers of unsaturated nitriles and monovinylidene aromatic hydrocarbons. The compositions are relatively economical and exhibit a reduced tendency toward coloration while maintaining good mechanical properties.

What is claimed is:

1. A stabilized composition comprising (1) an intimate admixture of a preformed interpolymer containing at least 1.0 percent by weight of a polymerized unsaturated nitrile monomer selected from the group consisting of acrylonitrile, methacrylonitrile, ethacrylonitrile, propacrylonitrile, butacrylonitrile, and mixtures of said nitrile monomers and at least 50 percent by weight of a monovinylidene aromatic hydrocarbon, and (2) about 0.05 to 3.0 percent, based upon the weight of said preformed interpolymer, of a stabilizer selected from the class consisting of terpinolene, dipentene, p-mentha-1,5-diene, p-cymene, 1,3-cyclooctadiene, octene, alpha-methylstyrene dimer and mixtures thereof.

2. The composition of claim 1 wherein said stabilizer is terpinolene.

3. The composition of claim 1 wherein said stabilizer is dipentene.

4. The composition of claim 1 wherein said nitrile monomer is acrylonitrile and said monovinylidene aromatic hydrocarbon is styrene.

5. The composition of claim 1 wherein said preformed interpolymer contains about 20 to 35 percent by weight of acrylonitrile and about 80 to 65 percent by weight of styrene, and is in intimate admixture with about 0.2 to 0.5 percent, based upon the weight of said preformed polymeric composition, of terpinolene.

References Cited

UNITED STATES PATENTS

| | | | |
|---|---|---|---|
| 3,005,805 | 10/1961 | Minckler et al. | 260—79.5 |
| 3,054,768 | 9/1962 | Quinn | 260—33.6 |
| 3,054,771 | 9/1962 | Hiestand | 260—23 |
| 3,092,609 | 6/1963 | Kostelitz | 260—45.9 |
| 3,356,644 | 12/1967 | Lee | 260—45.95 |

DONALD E. CZAJA, *Primary Examiner.*

R. A. WHITE, *Assistant Examiner.*

U.S. Cl. X.R.

260—85.5, 876, 893